United States Patent

[11] 3,569,830

| [72] | Inventors | Edward W. Gass;<br>Jack Hammond; Paul Lorenzino, Jr.,<br>Duncan, Okla. |
|---|---|---|
| [21] | Appl. No. | 028,280 |
| [22] | Filed | Apr. 21, 1970 |
| [45] | Patented | Mar. 9, 1971 |
| [73] | Assignee | Halliburton Company<br>Duncan, Okla. |

[54] FREQUENCY DIFFERENCE DETECTOR
12 Claims, 1 Drawing Fig.

[52] U.S. Cl. .................................................... 324/78,
324/79
[51] Int. Cl. .................................................... G01r 23/02
[50] Field of Search .......................................... 324/79

[56] References Cited
UNITED STATES PATENTS
3,304,504  2/1967  Horlander ..................  324/79X
FOREIGN PATENTS
1,144,842  3/1963  Germany ..................... 324/78

*Primary Examiner*—Alfred E. Smith
*Attorney*—Burns, Doane, Benedict

ABSTRACT: Method and apparatus for determining the difference in frequency or pulse repetition rate between two input signals irrespective of the relative frequency, phase or synchronism in which a predetermined number of pulses in one input signal is stored and subsequent pulses counted until a predetermined number of pulses in the second input signal are accumulated, at which time the process is repeated.

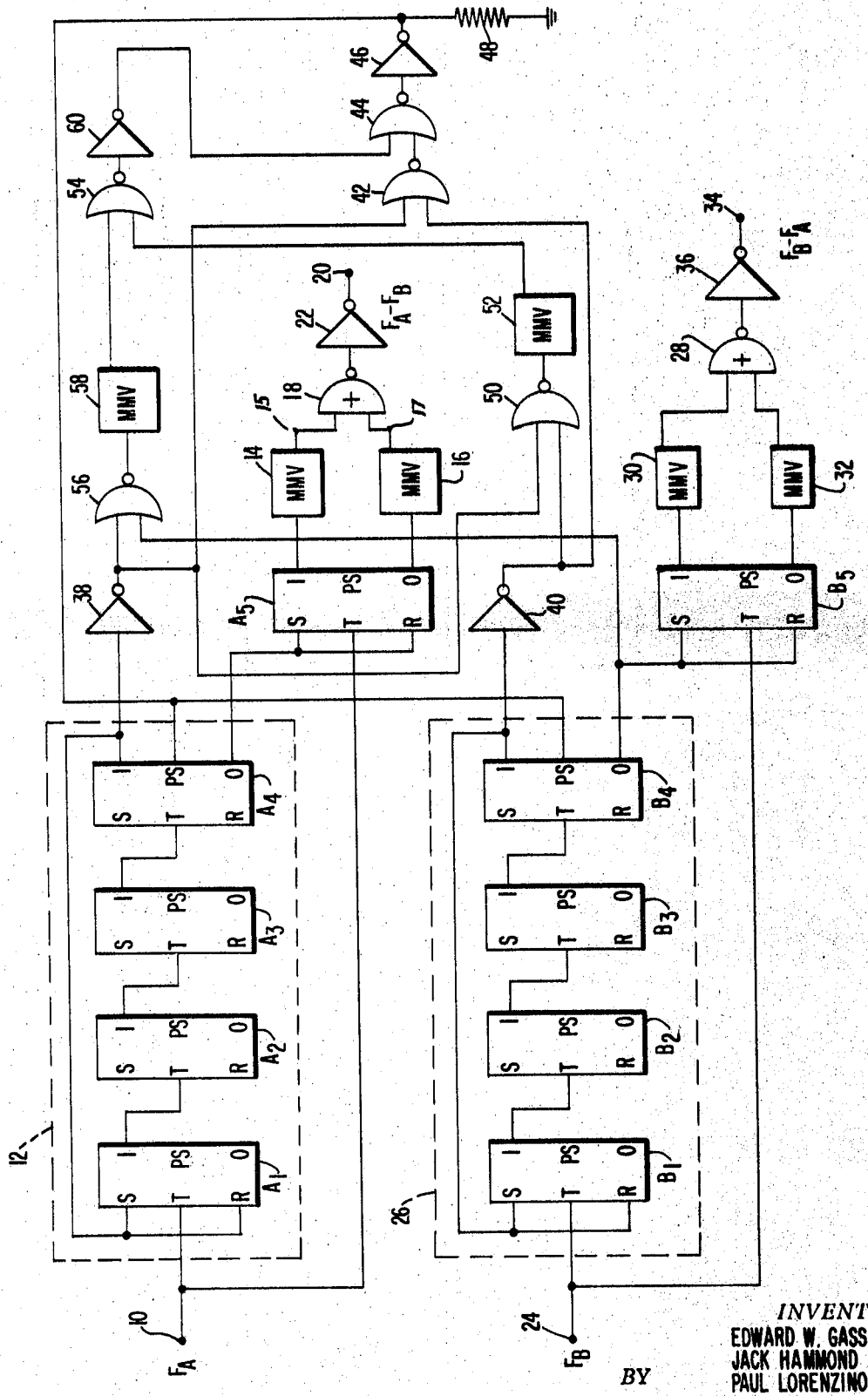

FREQUENCY DIFFERENCE DETECTOR

BACKGROUND OF THE INVENTION

The present invention relates to a circuit for determining the difference between the frequencies or pulse repetition rates of two electrical signals.

The prior art is replete with circuits for determining the difference between the pulse repetition rates of two series of electrical pulses. One of the prior art techniques has been to provide a circuit operable as a reversible counter, i.e., operable in one direction in response to the individual pulses in the first input signal and operable in the opposite direction in response to the individual pulses in the second input signal. Another of the prior art techniques has been the utilization of a first pulse in one of the input signals to enable a unidirectional counter to total the number of pulses in the first input signal which appear between the enabling pulse and the first pulse, a counter disabling pulse, which appears in the second input signal.

While both of these and other systems heretofore generally utilized are satisfactory under certain conditions, other conditions such as the simultaneous arrival of pulses in both of the input signals often introduces material error. This error may be particularly prevalent when the pulse repetition rates of the signals are at substantially the same frequency or when the frequency of one is a multiple of the frequency of the other.

Another deficiency of these prior art systems has been the introduction of significant errors when the two input signals are asynchronous even though operating at the same average frequency or pulse repetition rate.

It is accordingly a primary object of the present invention to provide a novel method and apparatus for determining the difference between the frequency or pulse repetition rate of two electrical signals.

Another object of the present invention is to provide a novel method and apparatus for determining not only difference between the frequency or pulse repetition rate of two input signals but also which of the two input signals has the greater frequency or pulse repetition rate.

Yet another object of the present invention is to provide a novel method and apparatus for determining the difference in frequency between two input signals which is not subject to errors introduced by the simultaneous application of pulses from both input signals.

A further object of the present invention is to provide a novel method and apparatus for determining the difference in pulse repetition rate of two asynchronous input signals having the same average frequency.

A still further object of the present invention is to provide a novel method and apparatus for reducing the output pulse storage capacity of a circuit for determining the difference in the pulse repetition ratio of two input signals.

The utilization of one of the signals or series of electrical pulses as a reference and the derivation of a control signal from the comparison to adjust the frequency or pulse repetition rate of the second signal or series of electrical pulses may be considered as a prime example of the many applications to which the present invention is particularly adapted. This would, e.g., include the synchronizing of the speed of two engines or other rotating apparatus by tachometer derived pulse trains as well as the adjusting of the operating frequency of an electronic oscillator.

Other applications, objects and advantages will, however, be readily apparent to one skilled in the art to which the invention pertains, from the following detailed description when read in conjunction with the drawing.

THE PREFERRED EMBODIMENT

Referring now to the embodiment illustrated in the drawing, an input terminal 10 is connected to the toggle terminal T of the first binary element A1 in a storage register 12. Storage register 12 includes binary elements A1, A2, A3, and A4, each connected to the toggle terminal T of the adjacently subsequent element. In addition, the binary 1 output terminal of the last binary element A4 is connected to both the set S and reset R terminals of the first binary element A1.

All of the binary elements utilized in the embodiment described are conventional in circuitry and operation so that a high signal level applied to the toggle terminal T will cause the binary element, irrespective of its state, to change that state reversing the complementary high and low signals present on the binary 1 and binary 0 output terminals. Likewise, the application of a high signal level to the set input terminal S will set a high signal on the binary 1 output terminal and the application of a high signal level to the reset terminal R will remove the high signal from the binary 1 output terminal and provide a high signal on the binary 0 output terminal. The application of a high signal level to the preset terminal PS will cause the binary element to assume a predetermined state, the reset state in the presently described embodiment.

The binary 0 output terminal of the last element A4 in the storage register 12 is connected to the set S and reset R input terminals of a binary element A5. The binary 1 output terminal of the binary element A5 is connected to a conventional monostable or one-shot multivibrator 14 which provides a high signal level on the true output terminal 15 thereof for a period of time commenced by the triggering of the multivibrator and terminated a predetermined time thereafter as determined by the RC time constant of the circuit.

The binary 1 and 0 output terminals of the binary element A5 are connected respectively to the input terminal of the monostable or one-shot multivibrators 14 and 16. The true output terminals 15 and 17 of the multivibrators 14 and 16 are connected to separate input terminals of an OR gate 18, the output terminal of which is connected through an inverter 22 to an output terminal 20.

In a similar manner, a second input terminal 24 is connected both to the toggle terminal T of a binary element B5 and the toggle terminal T of the first binary element B1 in a second storage register 26. Storage register 26 comprises binary elements B1, B2, B3, and B4, serially connected in the manner of the previously described storage register 26. The binary 0 output terminal is connected to the set S and reset R input terminals of the first binary element B1.

The binary 0 output terminal of the binary element B4 is connected to the set S and reset R input terminals of the binary element B5. The binary 1 and 0 output terminals of the binary element B5 are connected, respectively, to one of the input terminals of an OR gate 28 through monostable or one-shot multivibrators 30 and 32. The output terminal of the OR gate 28 is connected to a second output terminal 34 through an inverter 36.

The binary 1 output terminals of the last binary elements A4 and B4 in the registers 12 and 26 are connected, respectively, through inverters 38 and 40 to one of the two input terminals of a NOR gate 42. The output terminal of the NOR gate 42 is connected to one input terminal of a NOR gate 44 whose output terminal is connected through an inverter 46 across a resistor 48 to ground. The output terminal of the inverter 46 is also connected to the preset terminals PS of the last binary elements A4 and B4 in the registers 12 and 26.

The output terminal of the inverters 38 and 40 are also connected to the input terminals of NOR gate 50 whose output terminal is connected to the input terminal of a monostable or one-shot multivibrator 52. The true output terminal of the multivibrator 52 is connected to one input terminal of a NOR gate 54.

The output terminal of the inverter 38 is also connected to one input terminal of NOR gate 56. The other input terminal of NOR gate 56 is connected to the binary 0 output terminal of the last binary element B4 in the register 26. The output terminal of the NOR gate 56 is connected to the input terminal of a monostable or one-shot multivibrator 58. The true output terminal of the multivibrator 58 is connected to the other input terminal of the NOR gate 54. The output terminal of the NOR gate 54 is connected through an inverter 60 to the other input terminal of the NOR gate 44.

In operation with both registers initially cleared, a first series of electrical pulses having an average frequency or pulse repetition rate $F_A$ is applied to the toggle input terminals of the binary elements A1 and A5 by way of the input terminal 10. The binary element A5 is, however, locked up by the high signal level present on the binary 0 output terminal of the last binary element A4 in the register 12. Thus, the application of pulses from terminal 10 can effect no change in the output of the binary element A5 until the last binary element A4 in the register 12 has been toggled to its reset condition to remove the high signal level from the binary 0 output terminal thereof.

Each pulse in the first series of electrical pulses applied to the toggle input terminal T of the first binary element A1 in the register 12 is operative to change the state thereof as is customary in a conventional binary counter. The serially connected binary elements A1, A2, A3, and A4 thus operate in a well known and conventional manner until seven pulses have been stored in the register 12. On the application of the eighth pulse to the input terminal 10, the binary elements A1, A2 and A3, then being reset, revert to their set condition setting the binary element A4. This removes the inhibiting signal from the set S and reset R input terminals of the binary element A5. The high signal level on the binary 1 output terminal renders the first binary element A1 of the shift register 12 nonresponsive to further pulses applied to terminal 10.

The disabling signal from the binary element A4 having been removed, the binary element A5 is now responsive to the ninth and subsequent pulses in the first series of electrical pulses. Each pulse thereafter applied to terminal 10 will provide an output pulse on the output terminal 20 by way of either multivibrator 14 or 16, the OR gate 18 and the inverter 22.

The second register 26 operates in the same manner in response to the application of a second series of input pulses having an average frequency or pulse repetition rate $F_B$ to the second input terminal 24. In this manner, the first seven pulses in the second series of electrical pulses are stored in the register 26. None of these pulses is passed through the binary element B5 to the terminal 34 due to the high signal appearing on the binary 0 output terminal of the last binary element B4 in the register 26. The eighth pulse applied to the input terminal 24 will effect the triggering of the binary element B4 to its reset condition thereby blocking the first binary element B1 in the register 26 and unblocking the binary element B5 so that the ninth and subsequent pulses in the second series of electrical pulses will be passed by way of one of the multivibrators 30 and 32, the OR gate 28, and the inverter 36 to the second output terminal 34.

Assuming the application of signals to both of the input terminals 10 and 24 and that the average frequency $F_A$ of the first input signal applied to the terminal 10 is greater than the average frequency $F_B$ of the second input signal applied to the terminal 24, the register 12 will reach its capacity before the register 26, thus enabling the passage of pulses in the first series of electrical pulses from the input terminal 10 through the binary element A5 to the output terminal 20.

The NOR gate 42 is also enabled by the setting of the last binary element A4 in the register 12. Subsequent pulses in the first series of electrical pulses applied to terminal 10 will continue to be passed to the output terminal 20 until the register 26 has received eight pulses from terminal 24. When register 26 reaches its capacity, the inverted high signal level appearing on the binary 1 output terminal of the binary element B4 will be passed through the enabled NOR gate 42 to inhibit the NOR gate 44.

The application of a high signal level to either of the input terminals of the NOR gate 44 will remove the high signal level on the output terminal thereof to provide the high signal voltage level across the resistor 48. This provides the signal to preset the registers 12 and 26 to their completely cleared condition.

Since the storage capacities of the registers 12 and 26 are equal, the number of pulses appearing on terminal 20 at the time that the registers 12 and 26 are cleared will be equal to the difference between the number of pulses applied respectively to the input terminals 10 and 24, i.e., the difference between the average frequencies or pulse repetition rates $F_A$ and $F_B$ of the input signals.

In the situation where the average frequency $F_B$ of the second input signal is greater than the average frequency $F_A$ of the first input signal, the register 26 will reach its capacity first and divert the ninth and subsequent pulses applied to the input terminal 24 from the register 26 to the output terminal 34 by way of the binary element B5, multivibrators 30 and 32, the OR gate 28 and the inverter 36. The toggling of the last binary element B4 to its set condition also enables the NOR gate 42 by way of the inverter 40.

When the first storage register 12 reaches its capacity, the inverter high signal level present on the binary 1 output terminal on stage A4 will be passed through the enabled NOR gate 42 to inhibit the NOR gate 44. The inverted low output signal of the NOR gate 44 provides a high signal level across the resistor 48, thus presetting both of the registers 12 and 26 in the manner earlier described. The number of pulses applied to the output terminal 34 will thus be equal to the true difference between the number of pulses applied respectively to the input terminals 24 and 10, and difference between the average frequencies or pulse repetition rates $F_B$ and $F_A$.

A redundant circuit is provided for the presetting of the registers 12 and 26. Such a circuit is necessary due to the unpredictability of the conduction states of the binary elements A4 and B4 upon initial energization of the circuit of the present invention. If both of the binary elements A4 and B4 provide high signal levels on the binary 1 of the terminal thereof, the registers 12 and 26 will be preset via NOR gate 42 as earlier explained.

If, however, the binary element A4 does not assume this initial condition, it will do so upon receipt of a few pulses and the inverted high signal level which then appears on the binary 1 output terminal thereof will trigger the multivibrator 52 through the NOR gate 50. The NOR gate 50 was initially enabled by the high signal level on the binary 1 output terminal of the binary element B4. The triggering of the multivibrator 52 inhibits the NOR gate 54 which in turn inhibits the NOR gate 44 to provide the preset pulse to the registers 12 and 26 over the lead 49.

Similarly, should the binary element B4 assume a state wherein a low signal level was initially provided on the binary 1 output terminal thereof, the high signal level which subsequently there appears will be passed through the NOR gate 50 to trigger the multivibrator 52. The NOR gate 50 was, of course, enabled by the initial inverted high signal level on the binary 1 output terminal of the binary element B4. Triggering of the multivibrator 52 will inhibit the NOR gate 54 and in turn the NOR gate 44 to provide the preset pulse over lead 49 to the registers 12 and 26 in the manner earlier explained.

By providing means for storage at the input to the pulse difference determining counters, the circuit of the present invention may be made nonresponsive to asymmetry of the two input signals having the same or different average frequencies or pulse repetition rates. The storage capacity of the two registers 12 and 26 may, of course, be varied. It is a desideratum to have sufficient storage capacity to prevent erroneous output pulses due to the randomness of the application of the input pulses to the terminals 10 and 24.

Since the number of pulses applied to the output terminals represents the true difference between the pulses applied to the terminals 10 and 24 only at the time that the registers 12 and 26 are reset, the storage capacity of the registers should be reduced to a level which is insignificant when compared to the total number of pulses applied to the circuit. In the present embodiment, for example, the number of pulses which appear at one of the output terminals 20 and 34 may differ from the actual difference in the number of pulses in the two input signals by as much as eight. This is, of course, an insignificant number where the pulse repetition ratio of the input signals are on the order of kilohertz and where the sampling period is several hours in duration.

Since the predictability of the response of a circuit element to the application of simultaneous pulses from two sources may be a problem, providing a large storage capacity has this additional advantage of reducing the possibility of the simultaneous application of pulses to a circuit element. The storage capacity of the apparatus required to display the difference between the frequencies or pulse repetition rates of the two input signals is, of course, also materially lessened.

Although the invention has been described in considerable detail with reference to certain preferred embodiments thereof, it will be understood that variations and modifications can be effected within the spirit and scope of the invention as described above and as defined in the appended claims.

We claim:

1. The method of measuring the difference between the number of pulses in two series of electrical pulses comprising the steps of:
   a. providing a pair of registers, each of said registers receiving pulses from only one of said series of electrical pulses and having a capacity for storing a predetermined plurality of pulses;
   b. generating a first signal in response to the storage of said predetermined plurality of pulses of the signal having the higher pulse recurrence rate;
   c. counting the pulses of the signal having the higher pulse recurrence rate during a time interval commences by the generation of the first signal;
   d. generating a second signal in response to the storage of the same predetermined plurality of pulses of the signal having the lower pulse recurrence rate; and
   e. terminating the time interval during which pulses of the signal having the higher pulse recurrence rate are counted and resetting both of said registers in response to the generation of said second signal.

2. Apparatus for determining the difference between the number of pulses in two series of electrical pulses comprising:
   means for generating first and second series of electrical pulses;
   means for sensing the pulses in said first and second series of electrical pulses;
   a counter; and
   circuit means for applying pulses in said first series of electrical pulses to said counter during successive time intervals each commenced by the sensing of a predetermined plurality of pulses in said first series of electrical pulses and terminated by the sensing of the same predetermined plurality of pulses in said second series of electrical pulses.

3. The apparatus of claim 2 wherein said circuit means includes means for disabling the sensing of pulses in said first series of electrical pulses upon the commencement of each of said time intervals and for enabling the sensing of pulses in said first series of electrical pulses upon the termination of each of said time intervals.

4. The apparatus of claim 2 wherein said circuit means includes a pair of registers each connected respectively to receive pulses in said first and second series of electrical pulses and gate means for passing pulses in said first series of electrical pulses to said counter when enabled and for otherwise blocking the passage of pulses in said first series of electrical pulses to said counter, said gate means being enabled by the storage of said predetermined plurality of pulses in said first register and disabled by the storage of said predetermined plurality of pulses in said second register, both of said registers being cleared upon the disabling of said gate means.

5. The apparatus of claim 2 including a second counter and second circuit means for applying pulses in said second series of electrical pulses to said second counter during successive time intervals each commenced by the sensing of a predetermined plurality of pulses in said second series of electrical pulses and terminated by the sensing of the same plurality of pulses in the first series of electrical pulses.

6. Apparatus for measuring the difference in the number of pulses in two series of electrical pulses comprising:
   first and second sources of electrical pulses;
   first and second storage means;
   a first output terminal for indicating the difference in the number of pulses from said sources of electrical pulses when the number of pulses from said first source of electrical pulses is greater than the number of pulses from said second source of electrical pulses;
   a second output terminal for indicating the difference in the number of pulses from said sources of electrical pulses when the number of pulses from said second source of electrical pulses is greater than the number of pulses from said first source of electrical pulses;
   first circuit means for applying pulses from said first source to said first output terminal and to said first storage means;
   said first circuit means including first gate means for passing pulses from said first source of electrical pulses to said first output terminal when enabled and for otherwise blocking the passage of pulses from said first source of electrical pulses to said first output terminal, and first blocking means for making said first storage means nonresponsive to pulses from said first source of electrical pulses;
   said first storage means being connected to said first gate means and to said first blocking means for enabling said gate means and blocking said storage means in response to the accumulation of a predetermined plurality of pulses from said first source of electrical pulses in said first storage means;
   second circuit means including second gate means for passing pulses from said second source of electrical pulses to said second output terminal when enabled and for otherwise blocking the passage of pulses from said second source of electrical pulses to said second output terminal, and second blocking means for making said second storage means nonresponsive to pulses from said second source of electrical pulses;
   said second storage means being connected to said second gate means and to said second blocking means for enabling said gate means and blocking said storage means in response to the accumulation of said predetermined plurality of pulses from said second source of electrical pulses in said second storage means; and
   reset means connected to said first and second storage means, said first and second gate means, and said first and second blocking means for clearing said first and second storage means, disabling said first and second gate means, and unblocking said first and second blocking means.

7. The apparatus of claim 6 wherein said reset means includes multivibrator means triggered when the last of said fist and second storage means to accumulate said predetermined plurality of pulses accumulates said predetermined plurality of pulses.

8. The apparatus of claim 6 wherein said reset means includes a coincidence gate connected to said first and second storage means for receiving signals generated in response to the accumulation of said predetermined plurality of pulses in said first and second storage means.

9. The apparatus of claim 3 wherein said circuit means includes a pair of registers each connected respectively to receive pulses in said first and second series of electrical pulses and gate means for passing pulses in said first series of electrical pulses to said counter when enabled and for otherwise blocking the passage of pulses in said first series of electrical pulses to said counter, said gate means being enabled by the storage of said predetermined plurality of pulses in said first register and disabled by the storage of said predetermined plurality of pulses in said second register, both of said registers being cleared upon the disabling of said gate means.

10. The apparatus of claim 7 wherein said reset means includes a coincidence gate connected to said first and second storage means for receiving signals generated in response to the accumulation of said predetermined plurality of pulses in said first and second storage means.

11. Apparatus for measuring the difference in the number of pulses in two series of electrical pulses comprising:
first and second sources of electrical pulses;
first and second storage means;
an output terminal for indicating the difference in the number of pulses from said sources of electrical pulses when the number of pulses from said first source of electrical pulses is greater than the number of pulses from said second source of electrical pulses;
circuit means for applying pulses from said first source to said output terminal and to said first storage means;
said circuit means including gate means for passing pulses from said first source of electrical pulses to said output terminal when enabled and for otherwise blocking the passage of pulses from said first source of electrical pulses to said output terminal, and blocking means for making said first storage means nonresponsive to pulses from said first source of electrical pulses;
said first storage means being connected to said gate means and to said blocking means for enabling said gate means and blocking said first storage means in response to the accumulation of a predetermined plurality of pulses from said first source of electrical pulses in said first storage means; and
reset means connected to said first and second storage means, said gate means, and said blocking means for clearing said first and second storage means, disabling said gate means, and unblocking said blocking means in response to the accumulation of a like plurality of pulses from said second source of electrical pulses in said second storage means.

12. The apparatus of claim 11 wherein said reset means includes multivibrator means triggered when said second storage means accumulates said predetermined plurality of pulses and a coincidence gate connected to said first and second storage means for receiving signals generated in response to the accumulation of said predetermined plurality of pulses in said first and second storage means.